2,809,802

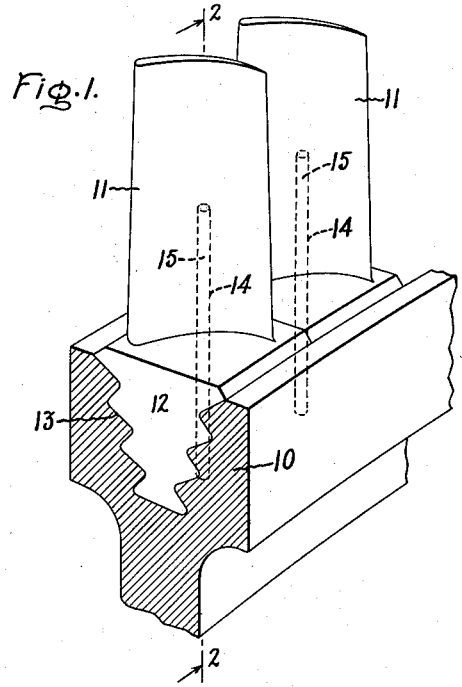
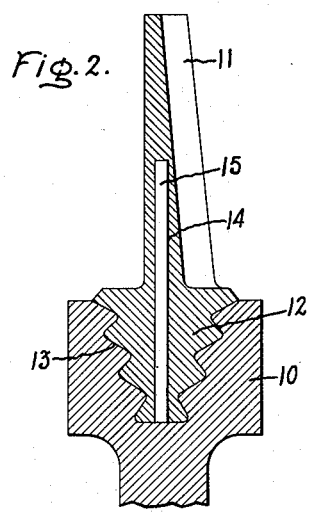

DAMPING TURBINE BLADES

Chauncey G. Suits, Schenectady, N. Y., assignor to General Electric Company, a corporation of New York Application September 10, 1952, Serial No. 308,843

3 Claims. (Cl. 253—77)

This invention relates to a self-damping turbine blade. The invention is concerned particularly with the vibration damping of blades used in gas turbines.

One of the serious problems met in gas turbine operation is the tendency of the turbine blades to fracture when subjected to a vibrational stress at or near resonant frequency. In many installations, gas turbines are operated under conditions of frequent acceleration and deceleration. During acceleration or deceleration of the turbine, the blades are, momentarily at least, subjected to vibrational stresses at their fundamental resonant frequency and in many cases to vibrational stresses at secondary or tertiary resonant frequenices. When a blade is subjected to a vibrational stress at or near its resonant frequency, its amplitude of vibration can readily build up to a point where fatigue fractures occur. Under controlled test conditions, such fractures have frequently been made to occur after a vibrational stress at the resonant frequency of but a few seconds duration. Such fractures have readily occurred in the very hard and heat-stable metals or alloys from which turbine blades are fabricated.

The blades which are most prone to fracture are those which are rigidly positioned in the turbine disk. In most cases, the presence of a slight fracture caused by vibration results in a damping effect which helps to safeguard the blade from further vibrational deterioration. However, the protection afforded by the damping effect of the fracture does not prevent further slow progress of the fracture, and it is not unusual for a portion of a turbine blade to be broken off entirely. This condition decreases the efficiency of energy conversion and unbalances the turbine disk thereby increasing vibration. The desirability of a turbine blade which will resist the fracturing effect of a vibrational stress at or near the resonant frequency vibration of the blade is obvious.

Accordingly, it is an object of this invention to provide a turbine blade which will resist fracture when a vibrational stress is applied thereto.

It is another object of this invention to provide a turbine blade which is self-damping.

It is a further object of the invention to provide a turbine blade which utilizes friction forces to achieve damping.

Briefly stated, in accordance with one of its aspects, this invention comprises a turbine blade having an elongated body contoured to convert a portion of the kinetic energy of a passing fluid stream to rotational mechanical energy, means on one end of the blade for mounting the blade on a turbine disk, and a hole opening from the mounting end of the blade and extending longitudinally into the body, the hole being fitted with a non-securing pin having a snug fit therein.

Referring to the drawing, Fig. 1 is a sectional view of a turbine blade damped in accordance with this invention; and Fig. 2 is a sectional view taken along the lines 2—2 of Fig. 1.

The rotating part of a turbine comprises a rotor or turbine disk 10 having a plurality of blades or buckets such as 11 mounted in uniform spacing around the periphery thereof. Each of the blades 11 consists of an elongated body contoured to convert a portion of the kinetic energy of a passing fluid stream to rotational mechanical energy. The blade 11 may be mounted on the disk 10 by means of a blade dovetail 12 having a fit with a disk dovetail 13. While a dovetail-type of mounting is illustrated, it is obvious that many other types of mounting would be entirely satisfactory.

The mounting end of the blade 11 has an opening or a hole 14 which extends longitudinally through a portion of the blade 11. The hole 14 which does not have to be round, may extend well over half-way through the blade 11. Positioned in the hole 14 is a non-securing pin 15 which has a snug fit with the hole 14 and extends along the entire length of the hole. The clearance between the hole 14 in the blade 11 and the pin 15 should be of the order of one-ten thousandth of an inch, but some damping effect is achieved with a clearance as great as one-thousandth of an inch. The materials of which the blade 11 and pin 15 are composed should preferably have the same coefficient of expansion, a condition best achieved by fabricating both parts of the same material. It is also preferred that the pin 15 have its axis positioned along a radial line of the turbine disk 10.

When a blade 11 such as that illustrated is subjected to a vibrational stress at its fundamental resonant frequency, the blade is bent around an axis which is transverse to the longitudinal axis of the blade. In other words, the bending axis is tangential to the wheel and located near the blade root or mounting. When the blade is bent in accordance with this fundamental mode, the pin 15 is flexed along with the blade. The flexing of the pin 15 opposes the bending of the blade and sets up frictional forces along those surfaces of the blade defined by the hole 14. These frictional forces tend to damp the vibrations thereby limiting the amplitude thereof.

Gamarekian Patent No. 2,682,167, issued June 29, 1954, and assigned to the same assignee as the present application, discloses a device which will test turbine blades by setting up vibrations in them at the various resonant frequencies of the blades. When a blade damped in accordance with this invention was tested in such a device, it withstood fracturing for a much longer period than blades in which the aperture 14 and pin 15 were omitted.

While the present invention has been described with reference to particular embodiments thereof, it will be understood that numerous modifications may be made by those skilled in the art without actually departing from the invention. Therefore, I aim in the appended claims to cover all such equivalent variations as come within the true spirit and scope of the foregoing disclosure.

What I claim as new and desire to secure by Letters Patent of the United States is:

1. A turbine blade comprising a solid elongated body contoured to convert a portion of the kinetic energy of a passing fluid stream to rotational mechanical energy, means on one end of said blade for mounting said blade on a turbine disk, said one end having an opening for a hole which extends longitudinally into a portion of said body, and a snug fitting solid non-securing pin positioned in said hole extending along the entire length thereof, the clearance between the pin and the wall being in the range of approximately 0.0001 inch to 0.001 inch, whereby vibration of the blade imparts relative motion between the said pin and the walls of said hole to generate rubbing friction for vibration damping of said blade.

2. A turbine blade comprising a solid elongated body contoured to convert a portion of the kinetic energy of a passing fluid stream to rotational mechanical energy, a dovetailed base on one end of said blade, said base having an opening for a hole which extends longitudinally into a portion of said body, and a snug fitting solid non-securing pin positioned in said hole extending along the entire length thereof, the fit between said pin and said hole lying in the range of between 0.0001 and 0.001 inch, said pin being composed of the same material as the blade, whereby vibration of said blade imparts relative motion between the said pin and the said walls of said hole to generate friction vibration damping.

3. A turbine blade comprising a solid elongated body contoured to convert a portion of the kinetic energy of a passing fluid stream to a rotational mechanical energy, a dovetailed base on one end of said blade, said base having an opening for a hole which extends longitudinally into a portion of said body less than the length thereof, a solid non-securing pin positioned in said hole extending along the entire length thereof, and said blade and said pin providing a clearance therebetween of the order of a ten thousandth of an inch, whereby said pin is adapted to produce rubbing friction between the surface thereof and the walls of said opening for frictional vibration damping.

References Cited in the file of this patent

UNITED STATES PATENTS

| | | |
|---|---|---|
| 1,362,853 | Darling | Dec. 21, 1920 |
| 1,833,751 | Kimball | Nov. 24, 1931 |
| 1,833,754 | Paget | Nov. 24, 1931 |
| 2,462,961 | Harker | Mar. 1, 1949 |
| 2,559,131 | Oestrich et al. | July 3, 1951 |
| 2,646,920 | Butcher | July 28, 1953 |

FOREIGN PATENTS

| | | |
|---|---|---|
| 710,766 | France | June 9, 1931 |